Dec. 1, 1964    K. G. ÅHLEN    3,159,246
HYDROSTATIC BRAKE

Filed May 25, 1962    6 Sheets—Sheet 1

INVENTOR
Karl Gustav Åhlen

BY
James C. Marbee
his ATTORNEY

Dec. 1, 1964     K. G. ÅHLEN     3,159,246
HYDROSTATIC BRAKE
Filed May 25, 1962     6 Sheets—Sheet 2

INVENTOR
Karl Gustav Åhlen
BY
James C. Markle
his ATTORNEY

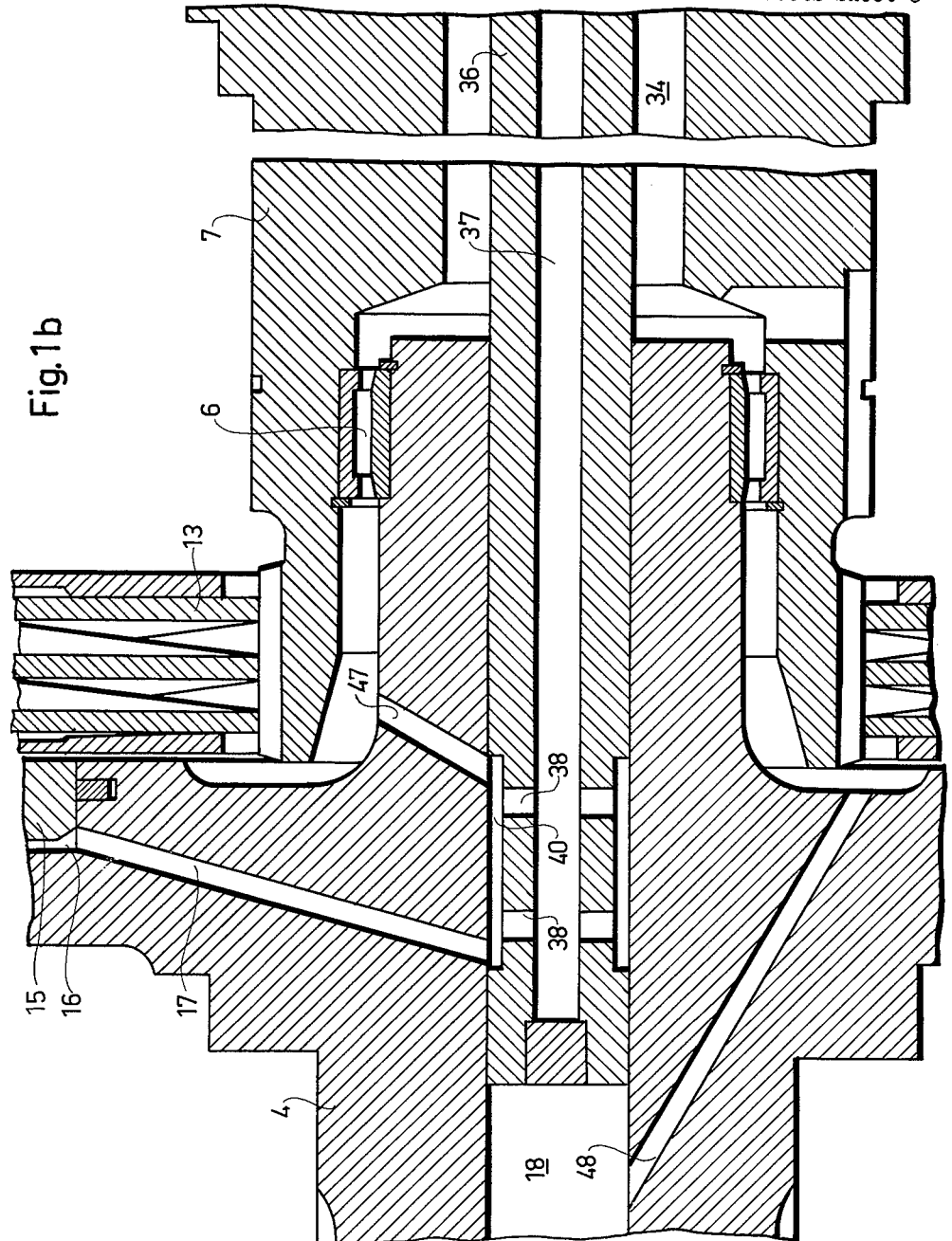

Dec. 1, 1964   K. G. ÅHLEN   3,159,246
HYDROSTATIC BRAKE
Filed May 25, 1962   6 Sheets-Sheet 4

Dec. 1, 1964  K. G. ÅHLEN  3,159,246
HYDROSTATIC BRAKE
Filed May 25, 1962  6 Sheets-Sheet 6

INVENTOR
Karl Gunter Åhlen
BY
his ATTORNEY

United States Patent Office 3,159,246
Patented Dec. 1, 1964

3,159,246
HYDROSTATIC BRAKE
Karl Gustav Åhlen, Stockholm, Sweden, assignor to Svenska Rotor Maskiner Aktiebolag, Stockholm, Sweden, a company
Filed May 25, 1962, Ser. No. 197,698
Claims priority, application Sweden May 26, 1961
22 Claims. (Cl. 188—92)

This invention relates to a brake device for rotating masses.

The device according to the invention is particularly suitable for braking of heavy vehicles such as trains for which great braking power has to be developed by the locomotive. However, the invention is not in any way limited to this service but is just as useful whenever a rotating mass has to be decelerated by braking of a shaft.

Hydraulic brakes in which the power to be dissipated is transformed into heat are already known per se. Those brakes, however, are impaired by one or more of the following defects.

The brake cannot be disengaged completely so that there always is a certain brake loss. This is true where the mechanical connection between the shaft and the brake is not disengaged but only the restrictions for the liquid circulation are removed or the brake is drained except for the liquid necessary for the cooling.

The brake is connected with the shaft by means of a positive clutch so that a special synchronizing device for the engagement of the brake is required which device is subjected to wear by every engagement.

The brake is connected with the shaft by means of a friction clutch with a limited torque transmitting capacity so that the braking power is limited by the limited torque of the clutch and the clutch is worn by the slip when the shaft and the brake are synchronized.

In both the last-mentioned brake devices, a considerable outside power is furthermore necessary to engage and to hold the clutch.

In the present brake device, however, a hydraulically operated friction clutch is incorporated between the shaft and the brake, which clutch is so connected with the pressure side of the brake pump that high pressure liquid from this pump selectively can be admitted to the clutch in order to hold it engaged.

In this way the following advantages are obtained.

The hydraulic pressure acting on the clutch increases proportionally to the discharge pressure of the pump so that the torque transmitting capacity of the clutch increases with an increase of the pump pressure in such a way that the torque transmitting capacity of the clutch is always sufficient for the entire torque, i.e. the clutch can never slip and it will for this reason never be subject to wear.

The entire force required to hold the clutch engaged is derived from the pump, i.e. the clutch is engaged by means of power that is to be dissipated by braking and does not need any outside source of pressure liquid or the like but is entirely self-contained.

In order to get engagement of the brake without jerking or surges it is furthermore desirable that the back pressure of the pump be built up gradually so that the braking power increases continuously. According to the invention such an increase is obtained by a throttling valve located in the outlet from the pump on the high pressure side. This valve is adjusted by a servo motor in response to the pump pressure, but operates with a delay or lag. To accomplish this end, the working chamber of the servo motor is connected with the pressure side of the pump by a conduit provided with a flow restricting or throttling orifice so that the increase of the servo motor pressure is delayed in relation to, or lags behind, that of the pump pressure. The servo motor is furthermore provided with a hydraulically operated piston directly connected with the throttling valve. The area of the piston is larger than that of the disc of the valve so that the valve can be closed by the servo motor. The pressure chamber of the servo motor is connected, however, by means of a relief valve discharging into the pump circuit on the low pressure side of the throttling valve, in order to limit the throttling of the pump outlet and thus the pump pressure and the braking power. Additionally the pressure chamber of the servomotor is connected with the suction side of the pump by a pipe in which a selectively adjustable valve is located in order to enable the throttling valve to be opened very rapidly.

In the drawings illustrative embodiments of the invention are shown.

FIGS. 1a, 1b and 1c show different details of FIG. 1 on a larger scale.

Figure 1:
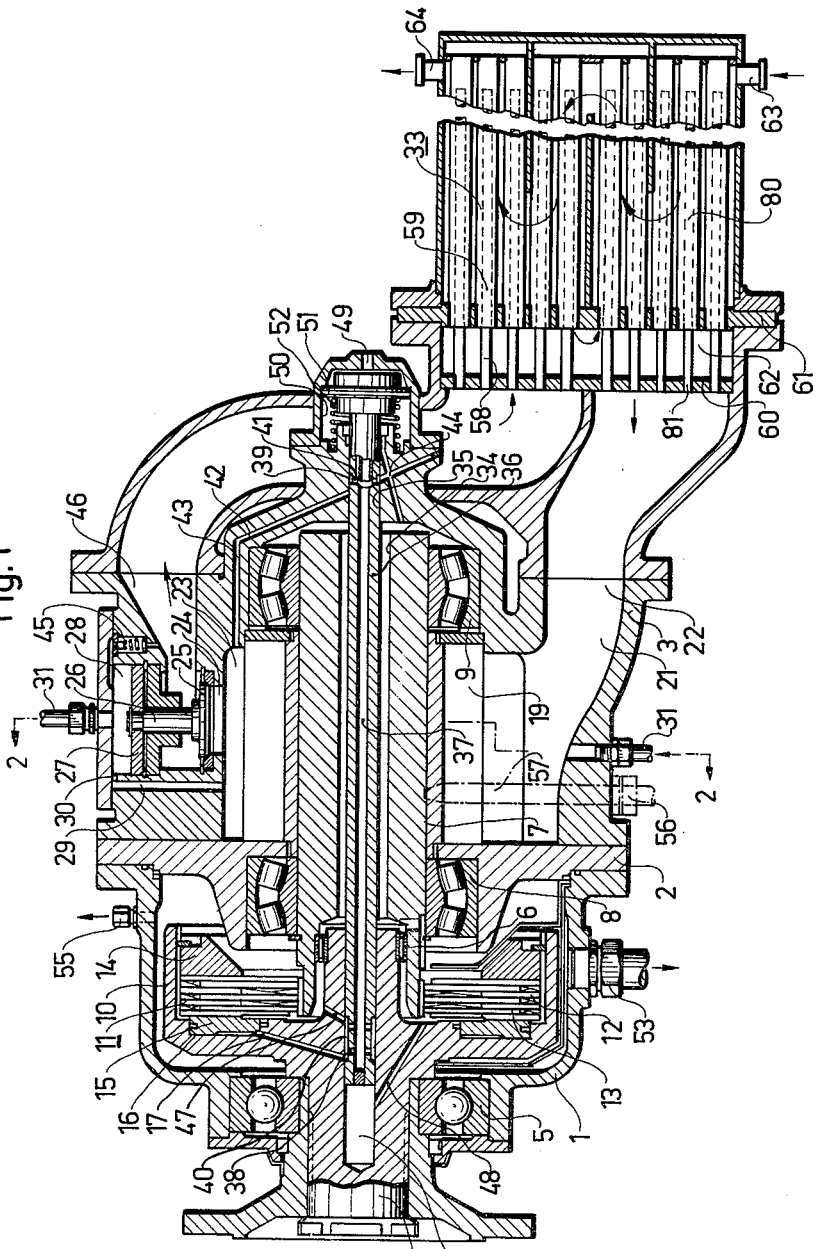
FIG. 1 is a longitudinal section of a brake device taken along the line 1—1 in FIG. 2.
Figure 2:
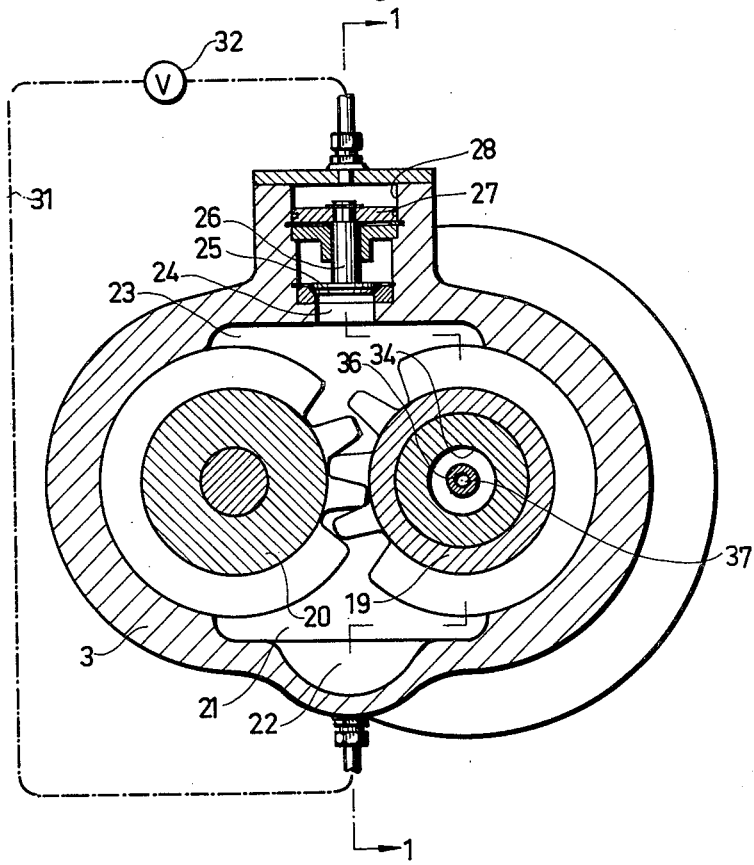
FIG. 2 is a transverse section taken along the line 2—2 in FIG. 1.

In FIGS. 1 and 2 a stationary housing comprising three separate parts 1, 2 and 3 is shown. A shaft 4 is mounted in the housing and mounted by means of a ball bearing 5 in the part 1 and by a needle bearing 6 on another shaft 7 which by roller bearings 8 and 9 is mounted in the parts 2 and 3 respectively.

The shaft 4 is provided with a part 10 formed as a cup in which a disc clutch 11 is located. This clutch comprises a number of discs 12 nonrotatably connected with the shaft 4 and a number of discs 13 nonrotatably connected with the shaft 7. In the cup-formed part 10 there is also located a pressure plate 14 fixed against axial movement away from the discs and a hydraulically operated clutch engaging piston 15 mounted in a pressure cylinder 16. The cylinder 16 is always in communication with a central bore 18 in the shaft 4 by at least one duct 17.

Figure 1A:
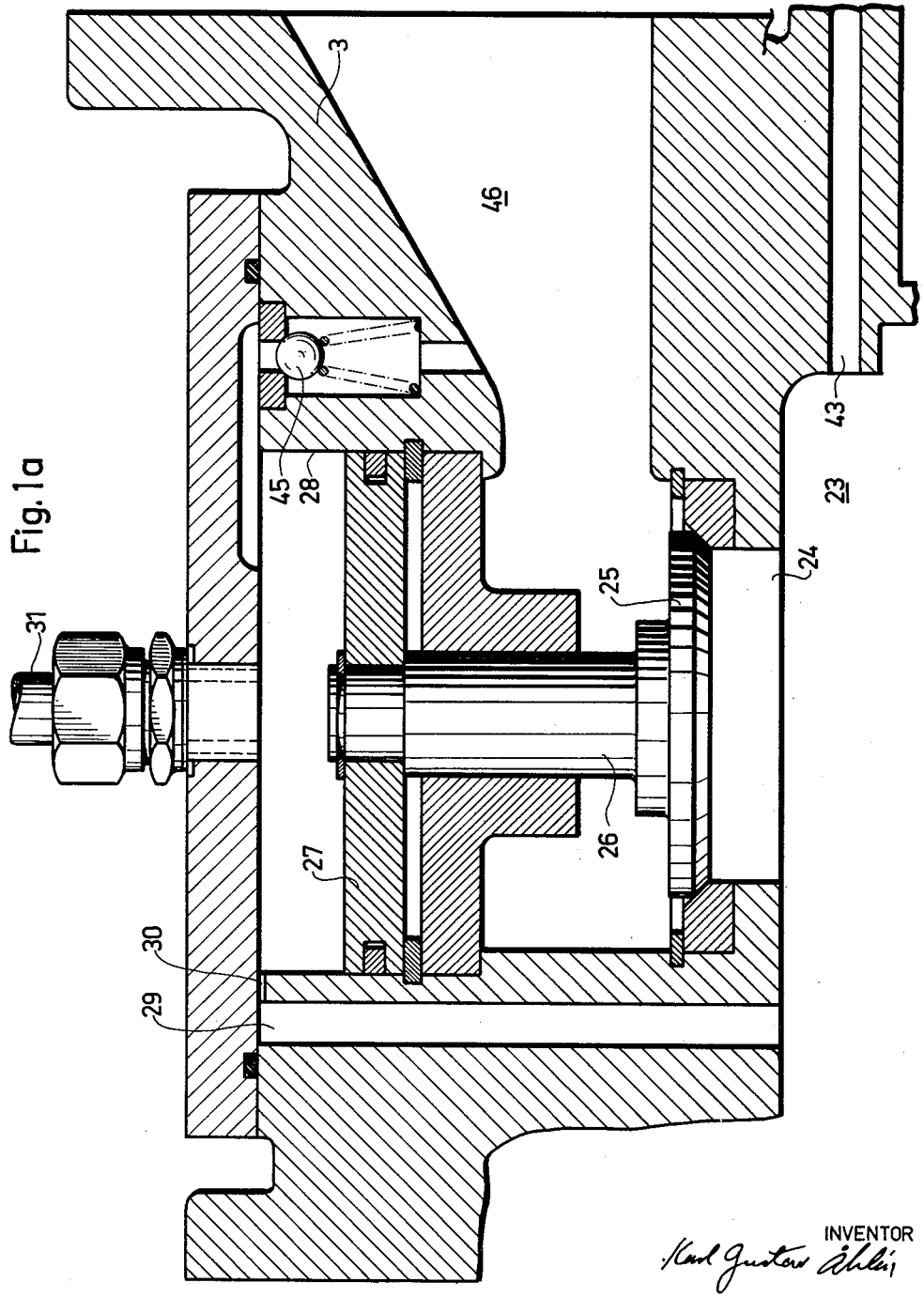

A gear 19 is nonrotatably mounted on the shaft 7. This gear 19 is in continuous intermesh with a second gear 20 (FIG. 2). These two gears are in sealing proximity to peripheral walls of the part 3 and of axial walls of the parts 2 and 3 of the housing. The two gears 19, 20 act as a positive displacement gear pump. On one side of this gear pump there is a low pressure chamber 21 located in the part 3 of the housing and provided with an inlet port 22 and on the other side of the pump there is a high pressure chamber 23 also located in the part 3 and provided with a high pressure port 24. (FIG. 1a.) A valve disc 25 is located in this high pressure port 24. The valve disc 25 is rigidly connected by a spindle 26 with a piston 27 located in a cylinder 28, the area of the piston 27 being larger than that of the valve disc 25. The cylinder 28 communicates through a channel 29 with the high pressure chamber 23 of the pump. The channel 29 has a portion 30 having a restricted area providing a throttling orifice. The cylinder 28 can also communicate by means such as a relief valve 45 with a low pressure channel 46 into which the liquid discharged from the pump is conducted after passing the high pressure port 24 and valve 25. The cylinder 28 also communicates with the low pressure chamber 22 of the pump by means of a duct 31 in which a selectively adjustable dump or quick discharge valve 32 (FIG. 2) is located. From the channel 46 the liquid flows through a high pressure cooler 33 where it exchanges heat with a cooling liquid and from the cooler to the low pressure chamber 22.

Figure 1C:
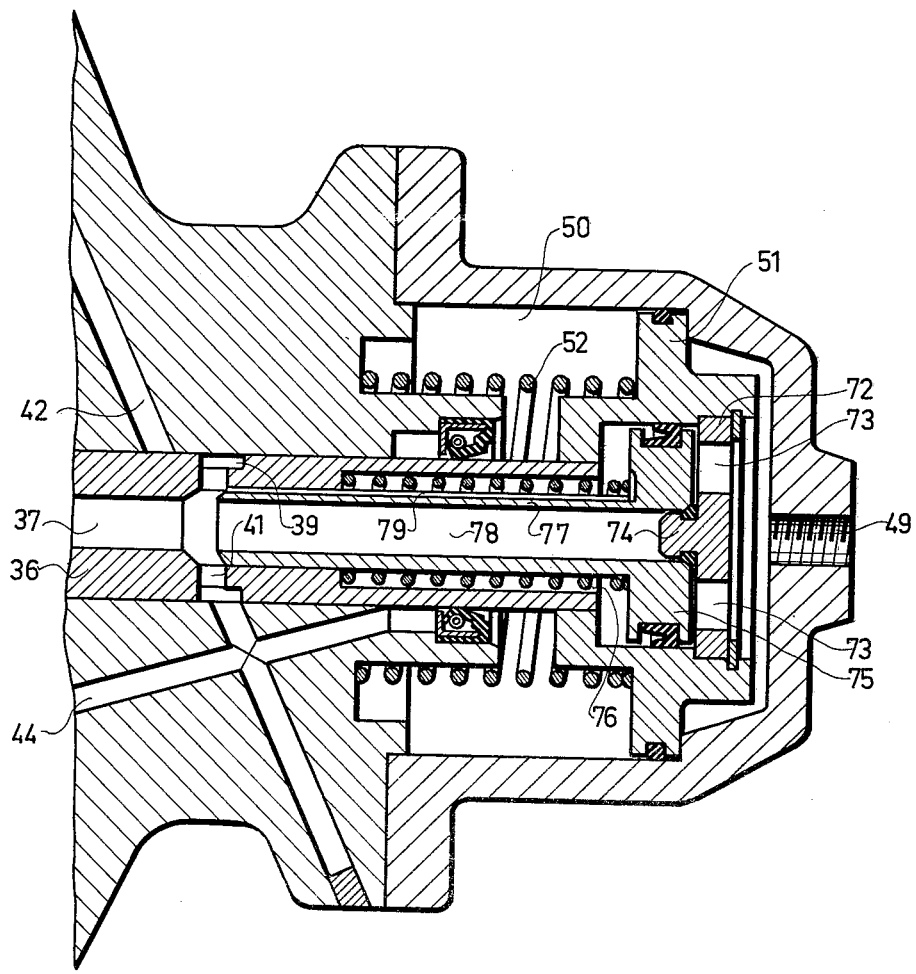

An axially slidable control valve 36 is located in the central bore 18 of the shaft 4, a central bore 34 of the shaft 7 and a bore 35 in the part 3 of the housing. The valve 36 is continuously in sealing proximity to the walls of the bores 18 and 35. The slidable valve 36 is provided with an axial bore 37. The valve 36 is furthermore provided with radial holes 38 and 41 which connect the central bore 37 with annular grooves 40 and 39, respectively, in the wall of the valve. The slide valve is adjustable between two different end positions. The axial extent of groove 40 is such that in both the end positions of the valve it communicates with the duct 17 so that there always is an open communication between the cylinder 16 and the bore 37. (FIG. 1b.) The groove 39 communicates in the left hand end position of the valve through bores 42, 43 with the high pressure chamber 23 of the pump and in the right hand end position through a bore 44 and the bore 34 with the low pressure duct 53 via the chamber containing clutch discs 12 and 13. (FIG. 1c.) In the right hand end position of the valve 36 the groove 40 furthermore communicates through a bore 47 with the clutch chamber. The innermost part of the bore 18 is moreover in continuous communication with the clutch chamber through the bore 48.

The slidable valve 36 is adjusted by pressure medium from an outside source not shown. Pressure medium is admitted to a cylinder 50 through a duct 49. In the cylinder 50 a piston 51 is located which piston is rigidly connected with the valve 36. When pressure medium is admitted, the piston 51 and the valve 36 are displaced against the action of spring 52 to a position where the bore 42 communicates with the groove 39 and, when pressure medium is shut off, the spring 52 displaces the piston 51 and the valve 36 to a position in which the bore 44 communicates with the groove 39.

A plate 72 is rigidly mounted in the piston 51. This plate is provided with several holes 73 axially through the plate and with a central projection 74 facing the valve 36. A further piston 75 is located in an enlargement of the bore 37. This piston 75 is provided with a spindle 77 extending axially through the valve 36 to the bore 41. A bore 78 extending through the spindle 77 and the piston 75 is adapted to be sealed by the projection 74. An open axial groove 79 is furthermore provided in the outer surface of the spindle 77 extending from the end of the spindle all the way to the piston 75.

Figure 3:
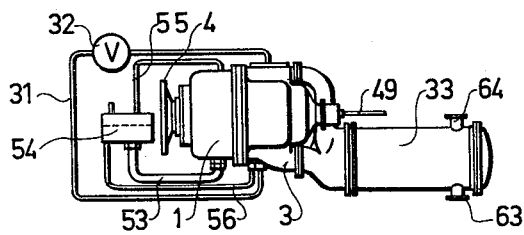
FIG. 3 is a schematic view of the brake device illustrated in FIGS. 1 and 2.

The liquid circulation between the brake and a tank 54 is shown in FIG. 3. From the clutch chamber in the part 1 of the housing the liquid flows through a duct 53 to a tank 54 simultaneously as the same pressure in the part 1 of the housing and the tank 54 is maintained through an air duct 55. From the liquid tank the liquid flows through a duct 56 to an injection nozzle 57 in the low pressure chamber 21 in order to get a pressure high enough to avoid cavitation.

The cooler 33 is of a type which is very well adapted for the rapid changes of the temperature and the corresponding changes of the length of the tubes of the cooler. The liquid circulates thus through pairs of concentric tubes 58, 59 and 80, 81. Each of the tubes is only fixed to one end wall 60 and 61, respectively. The inner tube 58, 81 is open in both ends while the outer tube 59, 80 is closed in one end. The inner tube is so much shorter than the outer one that they communicate with each other near the bottom of the outer tube. In order to increase the heat transmission guiding surfaces for the liquid are located between the two tubes. The liquid through the cooler is guided in such a way that the liquid passes through an inner tube 58 and backwards outside of this tube but inside the concentric outer tube 59 to a chamber 62 between the end walls 60 and 61. From the chamber 62 the liquid passes through another outer tube 80 and back through the concentric inner tube 81 to the inlet 22 of the pump. The outer sides of the outer tubes 59, 80 are continuously in contact with a cooling medium which is admitted to the cooler through the opening 63 and is carried away through the opening 64.

The brake according to the invention acts in the following way. The shaft 4 is rigidly connected with and continuously rotates with the shaft to be braked. In normal drive, without braking, the slide valve 36 is located in its right hand end position (as shown in FIG. 1) so that the groove 40 communicates with the bore 47 and thus the cylinder 16 communicates with the clutch chamber. The clutch is in this way disengaged and the shaft 4 can rotate freely in relation to the other parts of the brake device.

In order to engage the brake pressure medium is admitted through the duct 49 to the cylinder 50. In this way the piston 51 is moved to the left against the spring 52 until the communication between the groove 40 and the bore 47 is interrupted and the groove 39 is brought into communication with the bore 42. At the same time, the piston 75 is moved to the left against the spring 76 until the spindle 77 interrupts the communication between the central bore 37 and the bore 41. In this way the pressure fluid flows through the holes 73, the bores 78, 37 and 38, the groove 40, and the bore 17 to the pressure cylinder 16 so that the piston 15 is forced against the clutch discs 12, 13. This initial engagement of the clutch 11 is enough to produce torque enough to start the rotation of the pump gears 19, 20. When these gears rotate they produce a high pressure in the high pressure chamber 23. This pressure is transmitted through the bores 43 and 42, the groove 39, the bore 41, and the groove 79 to the back of the piston 75 so that the piston 75 with its spindle 77 is displaced to the right for sealing of the bore 78 by the projection 74. At the same time the pressure liquid flows from the bore 41 into the axial bore 37 and through the bores 38, the groove 40 and the bore 17 to the cylinder 16. In this way the torque of the clutch 11 and thus the pressure of the pump 19, 20 is increased. This increase of the torque results in a further increase of the pressure of the torque and so on.

The clutch 11 will thus be engaged in such a way that during the engagement period it will be subject to practically no slip as the pressure produced by the gear pump 19, 20 is so high that the force acting on the piston 15 is more than enough to press the discs 12, 13 against each other for sychronization with practically no slip.

When the pressure in the high pressure chamber 23 increases it is transmitted through the channel 29 to the cylinder 28 of the servo motor. Owing to the throttling orifice 30, however, the pressure in the cylinder 28 during the engagement period is lower than that in the high pressure chamber 23. The piston 27 of the servo motor has, however, a larger area than the disc of the valve 25 so that upon an increase of the pressure this valve closes the high pressure port 24 more and more. In this way the pressure in the high pressure chamber 23 increases rapidly. For a certain value of the pressure in the servo motor cylinder 28 determined by the adjustment of the relief valve 45 this valve will open so that the throttling movement of the valve 25 and the thus maximum pressure in the high pressure chamber 23 is limited. The liquid after passing the high pressure port 24 and valve 25 is conducted through the channel 46 to the cooler where it exchanges heat with a separate cooling medium. From the cooler 33 the liquid then flows back to the low pressure chamber 21 in order to be recirculated by the pump.

The brake is disengaged by releasing the admission of pressure of the fluid admitted through the duct 49. The slide valve 36 is then displaced to its right hand end position by means of the springs 52. In this position the groove 40 communicates with the bore 47. In this way the pressure cylinder 16 communicates with the clutch chamber through the bore 17, the groove 40 and the bore 47 so that the pressure in the cylinder 16 decreases to the same pressure as that in the clutch chamber which effects disengagement of the clutch. The torque transmission through the clutch 11 stops in this way and consequently the drive of the pump 19, 20. The pressure of the liquid in the pump is then rapidly equalized. This equalization can be further accelerated by opening valve 32 in the duct 31 between the servo motor cylinder 28 and the pump inlet 22. The shaft 4 is in this way completely disengaged and can without any braking rotate with the load shaft which has been decelerated during the braking.

Figures 4, 5:
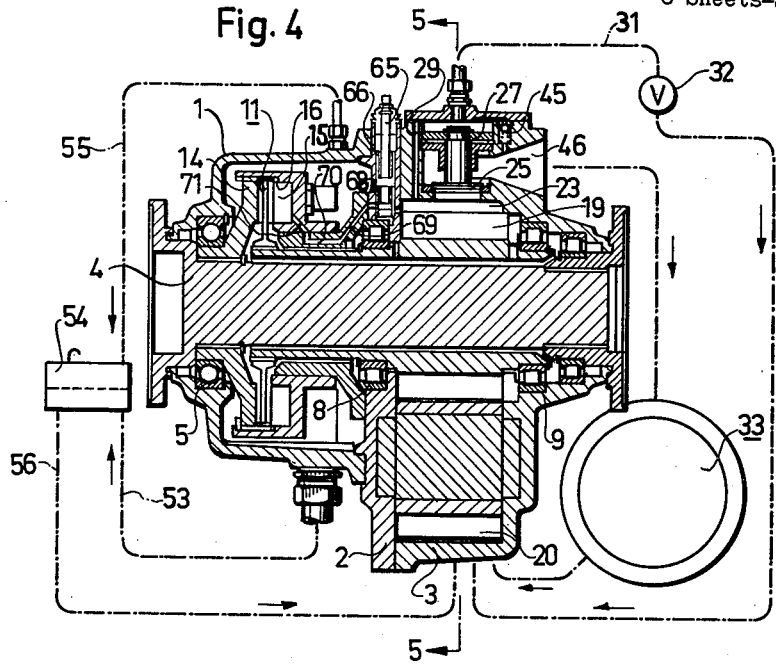
FIG. 4 is a longitudinal section through another embodiment of the invention along the line 4—4 in FIG. 5.
FIG. 5 is a transverse section taken along the line 5—5 in FIG. 4.

In FIGS. 4 and 5 another embodiment of the invention is shown which differs from the embodiment of FIGS. 1–3 by the fact that the shaft 4 extends clear through the brake device and that the central adjusting valve 36 is replaced by an adjusting valve 65 provided with a valve chamber 66 and located in the part 2 of the housing. The valve chamber 66 communicates with the high pressurue chamber 23 of the pump through the channel 67, with the clutch chamber through the channel 68, and with the pressure cylinder 16 with the piston 15 through the bores 69, 70, 71. In one end position of the valve 65 the cylinder 16 thus communicates with the high pressure chamber 23 of the pump so that the brake device is engaged. In the other end position of the valve 65 the cylinder 16 communicates with the clutch chamber so that the brake device is disengaged.

The embodiments shown are only examples of the way in which the invention can be carried out but the invention is of course not limited to those embodiments but comprises everything within the scope of the following claims.

I claim:

1. A hydrostatic brake for braking a load shaft connected to the load to be braked comprising a positive displacement pump having an input shaft, a throttle valve for throttling the discharge from the pump to create and maintain back pressure on the pump to resist operation thereof and thereby produce a braking effect on said load shaft, a servo motor responsive to the discharge pressure of the pump for actuating said throttle valve, a releasable clutch comprising a first element for driving said input shaft and a second element for connection with said load shaft, means responsive to the discharge pressure of the pump for engaging said clutch, selectively operable control means for controlling said pressure responsive means, and starting means for effecting sufficient initial engagement of said cltuch to start said pump and create a discharge pressure for effecting normal load carrying engagement of said clutch.

2. A brake as defined in claim 1 including means providing a time delay in the response of said servo motor to increase said pump discharge pressure.

3. A brake as defined in claim 1 including means for limiting the maximum value of the actuating pressure for said servo motor.

4. A brake as defined in claim 1 including means for quickly releasing the actuating pressure for said servo motor.

5. A brake as defined in claim 1 in which said throttle valve comprises an unbalanced valve member biased toward open positions by the pressure of the pump discharge.

6. A brake as defined in claim 5 in which said servo motor is capable of closing said throttle valve member against said pump discharge pressure.

7. A brake as defined in claim 6 in which said servo motor comprises a pressure chamber in communication with the discharge side of the pump and an element connected to said valve member and responsive to pressure in said chamber to close the valve.

8. A brake as defined in claim 6 in which said throttle valve member is a disc type valve closing against pump discharge pressure and said pressure responsive element of the servo motor is a piston of larger area than that of said valve disc.

9. A brake as defined in claim 6 in which the connection providing communication between said pressure chamber and the discharge side of the pump includes a flow restricting orifice for providing a time delay in the creation of pressure in said chamber.

10. A brake as defined in claim 6 in which a pressure relief valve is provided for limiting the maximum pressure in said pressure chamber.

11. A brake as defined in claim 10 in which said relief valve is adjustable to open at preselected pressure.

12. A brake as defined in claim 6 in which said chamber is provided with a selectively operable vent valve for quick release of pressure in the chamber.

13. A brake as defined in claim 1 in which said clutch is of the fluid pressure actuated type having a pressure chamber for actuating fluid.

14. A brake as defined in claim 13 including conduit means for connecting said pressure chamber with said pump discharge on the inlet side of said throttle valve.

15. A brake as defined in claim 14 in which said selectively operable control valve is interposed in said conduit means.

16. A brake as defined in claim 15 in which said control valve is shiftable between two positions in the first of which said pressure chamber is placed in communication with the pump discharge and in the second of which said chamber is vented.

17. A brake as defined in claim 16 including means for biasing said control valve to said second position.

18. A brake as defined in claim 17 in which said starting means for effecting said initial engagement of said clutch comprises means for supplying starting pressure fluid to the pressure chamber of the clutch.

19. A brake as defined in claim 18 in which said starting means is cooperatively associated with said control valve to cause admission of said starting pressure fluid to shift the control valve to said first position against the bias of said spring means.

20. A brake as defined in claim 19 in which said starting means includes a pressure responsive pilot valve responsive to both the pressure of said starting fluid and to the discharge pressure from the pump, said pilot valve being shifted to a first position when the pressure of the starting fluid exceeds that of the pump discharge in which communication between the pressure chamber of the clutch and the pump discharge is cut off and communication between said chamber and source of said starting pressure fluid is established and being shifted to a second position when the pump discharge pressure exceeds that of said starting pressure fluid in which communication between said chamber and the source of starting pressure fluid is cut off and communication between said chamber and the pump discharge is established.

21. A hydrostatic brake as defined in claim 1 including a heat exchanger and conduit means including said heat exchanger for conducting liquid discharged from said pump through said throttle valve to the inlet of the pump for recirculation therethrough.

22. A brake as defined in claim 21 in which said heat exchanger is of the surface type to which a cooling liquid is supplied.

References Cited in the file of this patent

UNITED STATES PATENTS

| 2,148,326 | Siekmann | Feb. 21, 1939 |
| 2,179,540 | Mc C. Burdick | Nov. 14, 1939 |
| 2,842,231 | Pepper | July 8, 1958 |